Dec. 22, 1964  I. R. ELDERS  3,162,462
UTILITY CART

Filed Feb. 14, 1962  2 Sheets-Sheet 1

Irene R. Elders
INVENTOR.

BY *Clarence A.O'Brien*
*and Harvey B. Jacobson*
Attorneys

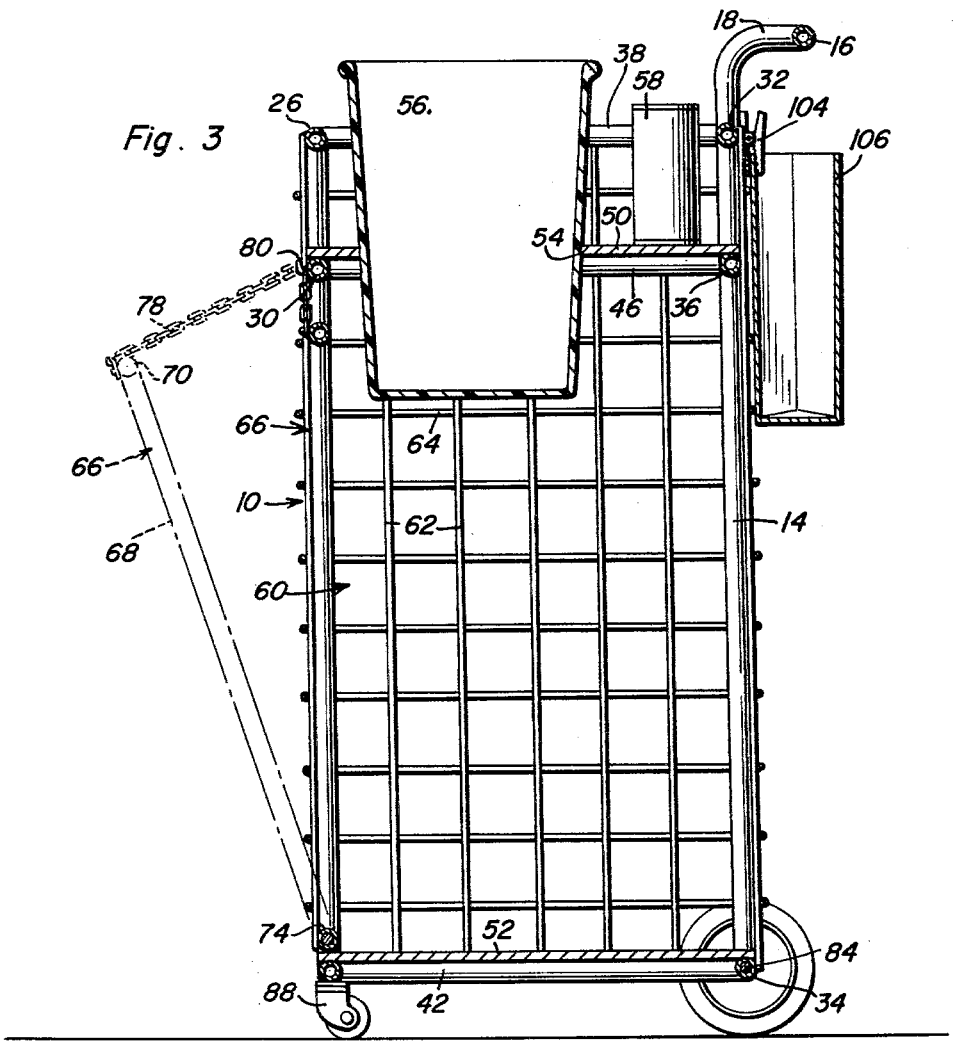

United States Patent Office 3,162,462
Patented Dec. 22, 1964

3,162,462
UTILITY CART
Irene R. Elders, 446 Ponus Ridge Road,
New Canaan, Conn.
Filed Feb. 14, 1962, Ser. No. 173,220
3 Claims. (Cl. 280—47.35)

This invention relates to utility carts, and more particularly to a utility cart of a type designed to alleviate the drudgery of housework.

Accordingly, it is a primary object of the invention to provide a uitlity cart that will be of substantial assistance to a housewife in performing her daily duties, and will eliminate many of the trips she makes getting cleaning supplies, emptying and washing ashtrays, picking up newspapers, and the many other odds and ends that accumulate with family living.

It is another object of the invention to porvide a utility cart with means thereon for supporting at apporximately waist high heighth various items and articles needed by a housewife in performing her daily duties. The cart is particularly designed for supporting a pail of wash water so that it cannot tilt, a dustpan, a broom, a mop, cleansing powders, a bag for receiving trash, and other miscellaneous articles.

It is another object of the invention to provide a utility cart having a large storage area for receiving and supporting articles, particularly items which are to be discarded such as old newspapers. The storage chamber is also particularly adapted for receiving and carrying laundry.

It is another object of the invention to provide a utility cart having a large storage chamber with a novel and improved entrance door.

It is another object of the invention to provide a utility cart which is light in weight, of rigid and durable construction, and is economical to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a vertical cross-sectional view taken substantially on the plane of line 3—3 in FIGURE 2.

Figure 1:
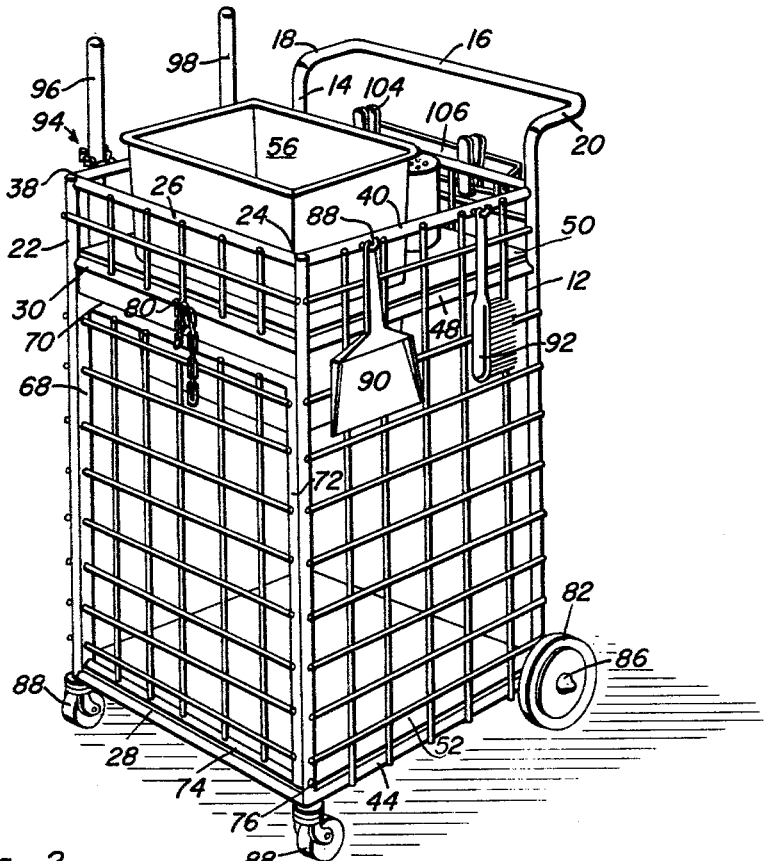
FIGURE 1 is a perspective view of the utility cart with various household cleaning utensils supported thereon.

With continuing reference to the drawings wherein like reference numerals indicate identical parts throughout the various figures, it can be seen that the utility cart includes a vertically elongated foraminous receptacle comprising a rigid, rectangular, box-like frame 10 composed of tubing. The back side of the frame 10 is composed of a substantially U-shaped member having parallel vertical legs 12 and 14 connected together at their upper ends by a bight portion 16 forming a handle for the cart. The upper ends of the legs 12 and 14 are deflected rearwardly to form handle support portions 18 and 20.

Figure 2:
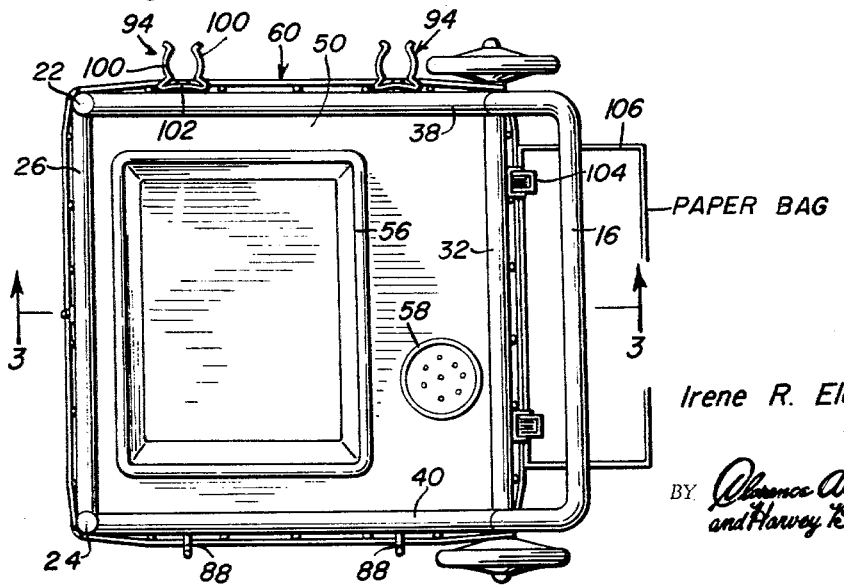
FIGURE 2 is a plan view of the cart shown in FIGURE 1 with most of the utensils removed therefrom.

The forward portion of the frame 10 includes two parallel vertically extending legs 22 and 24 spaced apart the same distance as the legs 12 and 14 and in alignment therewith so that the four legs form a rectangle in plan as shown in FIGURE 2.

The front legs 22 and 24 are rigidly connected together by upper and lower horizontal front braces 26 and 28 and an intermediate front brace 30. In a similar manner, the rear legs 12 and 14 are connected together by upper and lower horizontal rear braces 32 and 34 and an intermediate rear brace 36.

The front and rear legs of the frame 10 are securely connected together by parallel upper side braces 38 and 40, bottom braces 42 and 44 and intermediate side braces 46 and 48.

The upper surfaces of the braces 30, 36, 46 and 48 are coplanar and support a flat rectangular upper shelf 50. In a similar manner, the bottom braces 42, 44, 28 and 34 have their upper surfaces coplanar and support a bottom shelf 52 of the same size and shape as the upper shelf 50. The upper shelf 50 has a rectangular opening 54 in its forward portion which is of the same size and shape as the central portion of a bucket 56. The horizontal shape of the bucket 56 is preferably rectangular and the side walls thereof converge in a downward direction so that the bucket may be extended into the opening 54 and after the bucket is approximately half-way inserted into the opening, its outer side walls frictionally engage the sides of the opening 54 so as to prevent further movement of the bucket. A space is provided on the shelf 50 behind the bucket 56 for supporting containers of cleansing powder 58 and other miscellaneous articles.

The vertical sides of the frame 10 are enclosed by wire mesh panels 60 composed of vertically and horizontally extending wire rod members 62 and 64 which are connected together by conventional means such as welding. The wire mesh 60 is preferably pre-cut to rectangular patterns so as to fit the sides of the frame 10, and the ends of the wire rod members are welded to the frame.

An uncovered rectangular opening is provided between the front braces 30 and 28. This opening is normally closed by a rectangular door 66 which includes a rectangular foraminous frame comprising tubular members 68, 70, 72 and 74 secured together at their ends and covered by a rectangular portion of the wire mesh 60. The bottom edge of the door 66 is pivotally secured to the bottom of the frame by means of round pins 76 which extend through the bottom ends of the front legs 22 and 24 and into the ends of the tubular member 74 of the door. A small chain 78 is secured to the central portion of the tubular member 70 and a chain hook 80 is secured to the central portion of the intermediate front brace 30. By selectively engaging the hook 80 with any one of the chain links of the chain 78, the door 66 may be held closed or in a plurality of partially opened positions as shown in dotted lines in FIGURE 3.

A pair of rear wheels 82 are rotatably mounted on an axle shaft 84 which extends through the rear lower brace 34. Hub caps 86 may be secured to the outer ends of the axle 84 for retaining the wheels 82 thereon.

A pair of conventional caster wheels 88 are connected to the bottom portions of the legs 22 and 24. However, these caster wheels may be omitted if desired and replaced by extending the legs 22 and 24 below the floor 52 since the utility cart may be moved by tilting it rearwardly and pushing or pulling it on the wheels 82. However, the caster wheels 88 do facilitate the movement of the cart when in a vertical position.

The upper side brace 40 is provided with a plurality of substantially L-shaped hooks 88 which are particularly adapted for supporting small cleaning utensils such as a dustpan 90 and brush 92. The upper side brace 38 is provided with a plurality of conventional spring clamps 94 for supporting larger cleaning utensils such as a broom 96 and mop 98. As shown in FIGURE 2, the clamps 94 have opposing arcuate portions 100 connected by a spring portion 102 whereby the spring portion urges the arcuate portions into gripping engagement with the circular handles of the cleaning utensils 96 and 98.

The upper rear brace 32 has secured thereto a plurality of spring-closed alligator clips 104 of conventional design. The alligator clips extend downwardly and are particularly adapted for supporting a paper bag 106 in an open position as illustrated in FIGURES 2 and 3.

In view of the above description, it is believed that the operation and use of my utility cart is obvious. However, it may be added that the bucket 56 supports water for scrubbing and cleaning. The water and cleaning articles are supported at an elevation that eliminates practically all stooping and bending. Thus, the cart is particularly adapted for use by people having arthritis or are otherwise disabled. By having the container or bucket 56 wedged within the opening 54, spillage of the scrub water is practically eliminated. The water in the bucket may be used for washing ashtrays, wiping off fingerprints, cleaning plastic topped tables and for cleaning the fixtures in powder rooms. The rectangular shape of the pail particularly adapts it for use with a squeeze-sponge wet mop.

The paper bag 106 is supported in an open position by the alligator clips 104 and is particularly useful for receiving the contents of ashtrays and other small trash picked up by the housewife. The hooks 88 and clamps 94 support the cleaning utensils at a convenient elevation which eliminates stooping. The compartment between the floors 50 and 52 is particularly adapted for carrying laundry or other miscellaneous articles such as newspapers and larger trash. By supporting the door in a partially opened position by the chain 78 as illustrated in FIGURE 3, easy access is permitted to the storage chamber while at the same time articles are prevented from falling therefrom.

The structural components of the utility cart are preferably composed of aluminum. However, the floors 50 and 52 may be composed of wood if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A multipurpose household self-contained device comprising, in combination, a portable cart characterized by a rigid, vertically elongated openwork box-like frame, said frame embodying pairs of spaced, parallel, vertical front and rear legs, said rear legs including rearwardly bent upper end portions having a lateral and an integral handle extending therebetween, upper, intermediate and lower front braces extending between the front legs, upper, intermediate and lower rear braces extending between the rear legs, upper, intermediate and lower side braces extending between the front and rear legs, caster wheels mounted in the lower end portions of the front legs, an axle extending through the lower rear brace and projecting beyond the ends thereof, supporting wheels on the end portions of said axle, wire mesh panels mounted on the sides and rear of the frame, means comprising a vertically swingable door closing the front of the frame and providing access to said receptacle portion, said door including a generally rectangular frame comprising upper, lower and side members, pins in the end portions of said lower door member projecting therefrom and journaled in the front legs adjacent to but upwardly vertically spaced from said lower front brace for pivotally mounting said door between said front legs, means for releasably securing the door in adjusted positions on the front legs, a removable bottom shelf in the lower portion of the frame resting on the lower front, rear and side braces and extending beneath the pivoted end of the door, and a removable upper shelf in the frame resting on the intermediate front, rear and side tubular braces, said upper shelf having an opening therein, and a downwardly tapered bucket-like container fitting removably into said opening, the open top thereof projecting to a plane above the plane of the uppermost portion of said frame.

2. The combination of claim 1, said door securing means including a hook on the intermediate front tubular brace, and a chain on the free end of the door adjustably engageable with said hook.

3. The combination of claim 2, together with a plurality of downwardly-opening clips mounted on said tubular upper rear brace, and a disposable bag removably secured in the clips and depending therefrom and resting against the receptacle in a manner to be supported thereby in an open position beneath the handle and means for removably hanging a plurality of utensils on the upper side braces.

References Cited in the file of this patent

UNITED STATES PATENTS

| | | |
|---|---|---|
| D. 158,876 | Lowell | June 6, 1950 |
| D. 182,716 | Ferguson | Mar. 6, 1958 |
| 1,357,104 | Lightfoot | Oct. 26, 1920 |
| 1,746,134 | Thompson | Feb. 4, 1930 |
| 2,116,312 | Hollett | May 3, 1938 |
| 2,311,422 | Walling | Feb. 16, 1943 |
| 2,527,953 | Muffley | Oct. 31, 1950 |
| 2,726,913 | Freeman | Dec. 13, 1955 |
| 2,808,191 | Cramer | Oct. 1, 1957 |
| 2,831,698 | Mills | Apr. 22, 1958 |
| 2,875,970 | Gardner | Mar. 3, 1959 |
| 3,055,665 | Gmeiner et al. | Sept. 25, 1962 |